US006632261B2

(12) United States Patent
Hamilton et al.

(10) Patent No.: US 6,632,261 B2
(45) Date of Patent: Oct. 14, 2003

(54) METHOD AND APPARATUS FOR PYROPHORIC AND OTHER TYPE GAS LINE EXPLOSION SUPPRESSION

(76) Inventors: Mark Hamilton, 1300 N. Banana River Dr., Merritt Island, FL (US) 32952; Brian Gardner, 38535 SW. Rayjean La., Gaston, OR (US) 97119; Roy Browning, 3846 SE. Oak Ct., Hillsboro, OR (US) 97123

(*) Notice: Subject to any disclaimer, the term of this patent is extended or adjusted under 35 U.S.C. 154(b) by 0 days.

(21) Appl. No.: 09/905,613

(22) Filed: Jul. 13, 2001

(65) Prior Publication Data

US 2003/0010000 A1 Jan. 16, 2003

(51) Int. Cl.$^{7}$ .......................... B01D 29/56; B01D 35/14

(52) U.S. Cl. ..................... 55/418; 55/482; 55/DIG. 20; 220/88.2; 48/192

(58) Field of Search .......................... 55/482, 320, 325, 55/385.2, 418, 446; 220/88.1, 88.2; 431/346; 48/192

(56) References Cited

U.S. PATENT DOCUMENTS 1,586,195 A * 5/1926 Hall .......................... 220/88.2
1,699,244 A * 1/1929 Lewis .......................... 169/57
1,907,976 A * 5/1933 Jones .......................... 48/192
4,973,451 A * 11/1990 Vickery ...................... 422/110

* cited by examiner

*Primary Examiner*—Robert A. Hopkins
(74) *Attorney, Agent, or Firm*—William S Lovell

(57) ABSTRACT

A flash arrestor applicable to suppress explosions in gas lines generally, but specifically appropriate for suppressing explosions of pyrophoric gases, particularly silane in connection with integrated circuit manufacturing, has two identical flash suppression assemblies that are interconnected and act bidirectionally so as to suppress explosions occurring on either side of the apparatus. The positioning of a poppet relative to a poppet seat can be set manually into "open," "closed" and "armed" positions, the latter indicating that the apparatus has been configured so as to intercept automatically any explosion that is transmitted to it through a gas line so as to yield a valve "closed" configuration, and that closed position can then be locked in manually. Sets of baffles, suppression media and shock resonating orifice plates serve not only to close the necessary valves to prevent damage to equipment to which the apparatus is connected, but also to extinguish combustion within the apparatus itself and back up the line to the source of the explosion. The valves are self-actuating under breach conditions.

5 Claims, 3 Drawing Sheets

METHOD AND APPARATUS FOR PYROPHORIC AND OTHER TYPE GAS LINE EXPLOSION SUPPRESSION

CROSS-REFERENCE TO RELATED APPLICATIONS

None

STATEMENT REGARDING FEDERALLY SPONSORED RESEARCH OF DEVELOPMENT

Not applicable

BACKGROUND OF THE INVENTION

1. Field of the Invention

This invention relates to methods and apparatus for suppressing explosions in gas lines, including natural gas lines and the like but specifically relating to gas lines carrying pyrophoric gases such as silane ($SiH_4$).

2. Description of the Related Art

Silane ($SiH_4$) is a pyrophoric gas used extensively in semiconductor manufacturing. When silane is exposed to even very small amounts of oxygen, the silane will burn extremely quickly, leaving behind a white powdery residue of "sand-like" material (i.e., $SiO_2$). In the normal course of semiconductor operations, silane lines are sometimes compromised through small leaks or cracks and exposed to oxygen. When this occurs, the resulting reaction burns through the silane line in both directions, leaving behind the powdery residue and rendering the line unusable. All lines and exposed equipment where this occurs require replacement, often at quite significant cost and effort. This occurs frequently enough that some facilities are known to install duplicate silane lines during construction for just these events. The present invention constitutes a method and apparatus intended to stop any such explosive reaction as soon as it encounters the apparatus, thus protecting all equipment on the side of the apparatus opposite the origin of the explosion.

The present invention provides a method and apparatus for first detecting and then terminating the occurrence of an explosion in a gas line, particularly as to an explosion of silane gas within a pipe line in the course of semiconductor chip fabrication. Silane ($SiH_4$) is a pyrophoric gas, and must be contained within a pipe line that isolates the silane from the atmosphere. Upon any leakage of air into that pipe line, the silane can explode to yield disastrous results both to the particular operation and to the facilities as a whole, especially with respect to the wafer fabrication chambers within which the wafer is to be fabricated in part through use of the silane gas. The invention does not prevent an explosion, but rather limits the extent of damage that an explosion produces, and in particular "downstream" damage towards those fabrication chambers. The method and apparatus can also be used for the handling of other gases under similar circumstances.

Operation of the invention rests on event detection, on the immediate reduction of heat within an explosion by use of a filter medium, and then upon application of the initial pressure surge of the explosion to a multi-port diaphragm that both inhibits re-initiation of the explosion and protects the downstream portion of the gas line. The latter step is of particular importance in semiconductor fabrication, since that work requires an ultimately clean environment, and if contaminated by a silane explosion, a gas line becomes useless for that purpose and must be replaced.

The prior art in this field has been concerned with the suppression or limitation of damage of (a) explosions in enclosed spaces and (b) the prevention of flashback along a pipeline from an intended combustion source back to a source of combustible fuel. As will be shown below, none of the prior art of which the inventors are aware has considered downstream damage effects of pipeline explosions, or in particular the suppression of explosions of pyrophoric gases in a pipeline. Filter type media have been used to control small explosions such as exists in auto air bags. High purity diaphragm valves are used throughout the semiconductor business, but none in the manner of the present invention. Prior devices have been simply on/off devices manually or air actuated.

The control of fire has as long a human history as perhaps any other activity other than stone tool-making. In modern times, such activities center largely on apparatus, most often operated electrically, that first detect the presence of a fire and then release a fire suppressant in response thereto. Typical of such endeavors is the apparatus disclosed in U.S. Pat. No. 5,718,294 issued Feb. 17, 1998, to Billiard et al., together with U.S. Pat. No. 5,816,330 issued Oct. 6, 1998, to the same inventors, which treat a manually operated handle that initiates either an electrically responsive initiator or a gas-generating cartridge activator, these then acting to generate, e.g., the firing of a blasting cap, so as to rupture a disc to release fire suppressant to the area. Another device that employs such a rupture disc is found in U.S. Pat. No. 6,006,842 issued Dec. 28, 1999, to Stilwell et al.

Somewhat different types of fire detection and suppression apparatus are found in U.S. Pat. No. 5,826,664 issued Oct. 27, 1998, to Richardson, which discloses such a device mounted externally to a tank within which a fire or explosion is to be suppressed by injection of suppressant medium into the tank, and in U.S. Pat. No. 6,012,532 issued Jan. 11, 2000, to Kiefer et al., which discloses a flexible bladder containing an inert gas that upon rupture of the bladder will help suppress a fire or explosion.

U.S. Pat. No. 6,104,301 issued Aug. 15, 2000, to Golden, discloses a fire detection and suppression device that operates through an electronic processor to detect and respond also to other types of hazard, e.g., as an intrusion detector. A more extensive electronically operated fire detector and suppressor which employs several detection means and provides multi-level responses is described in U.S. Pat. No. 6,057,549 issued May 2, 2000, to Castleman. Although this '549 patent to Castleman mentions the clean room environment as an example of one in which fires can occur, none of the aforementioned patents address fires or explosions that actually occur within a pipeline.

Further elaboration of the specific features that appear in these patents are found in U.S. Pat. No. 4,173,140 issued Nov. 6, 1979, to Liebman et al., which discloses a trigger device including a pressure sensor and at least two flame sensors, and which serves to erect an explosion barrier in front of an explosion to limit its extent; U.S. Pat. No. 5,225,622 issued Jul. 6, 1993, which discloses an acoustic shock wave attenuating assembly; U.S. Pat. No. 4,505,180 issued Mar. 19, 1985, to Hinrichs, which discloses a rupture disc assembly that does not burst under high pressure from one direction but bursts at a relatively low pressure from the opposite direction and is useable in the context of hand-held firearms; U.S. Pat. No. 4,579,315 issued Apr. 1, 1986 to Kowalski, which discloses a quick-opening valve for release of fire suppressant after having been activated by an electrical signal; U.S. Pat. No. 6,031,462 issued Feb. 29, 2000, to Van den Schoor et al., which discloses a rate-of-rise detector that monitors the pressure within a protected area and generates a signal to release fire suppressant when that pressure increases at more than a predetermined threshold rate; and U.S. Pat. No. 5,122,628 issued Jun. 16, 1992 to McClelland et al., which discloses a pressure increase detector for the like purpose.

Another body of patents specifically treats the occurrence of explosions in gas-containing pipe lines, but none of such patents of which the inventors are aware addresses the particular problem of pyrophoric materials. Thus, U.S. Pat. No. 5,103,916 issued Apr. 14, 1992, to McClelland, discloses a differential fire and explosion protection system for protection against explosions in pneumatic transport systems, often used with process equipment, that convey potentially combustible particulate materials such as dust. Two thermocouples, one fast-responding and the other slow-responding, are disposed within an air outlet duct, and the occurrence of a temperature differential between the two thermocouples, arising from an explosion, causes shut-down of the blower operating the transport system, and the resultant pressure drop, along with subsequent release of fire suppressant material, act to control the explosive condition.

U.S. Pat. No. 4,928,255 issued May 22, 1990, to Brennecke et al., describes a method and apparatus for explosion protection in pipelines and the like by monitoring chronologically successive values of the system pressure in a potentially explosive area and comparing the values obtained with a predetermined pressure threshold so as to enable initiation of explosion protection means, e.g., the release of extinguishing agents. The invention seeks greater accuracy and faster response in recognizing a dangerous condition by way of setting the pressure threshold on the basis of recently recorded pressure values.

U.S. Pat. No. 5,794,707 issued Aug. 18, 1998, to Alhamad, describes a passive flame arrestor disposed within a pipeline or conduit to prevent upstream backflashing (to the source of flammable material), and comprises a contained layer of nested spheroids formed from expanded metal sheets made from magnesium alloy foil.

U.S. Pat. No. 5,676,712 issued Oct. 14, 1997, to Anderson, describes an active flame arrestor system that includes monitoring a flow system through which is passing a stream of combustible gas, detecting by optical mean a deflagration event that produces a propagating flame front, and opposedly directing at such a flame front a pressurized non-flammable gas of sufficient volume and velocity to extinguish that flame front. The system is useable in clean rooms in which are manufactured integrated circuits, and that use may apply to production lines that employ pyrophoric gases such as silane. The present invention is distinguishable from Anderson, however, in that the latter does not address the problem of downstream gas line contamination from silane combustion.

Specifically, if a silane line is compromised by the entry of air, the silane burns as a flame that spreads from the source of air entry on through the line in both directions, and in the process the flame produces a sand-like residue that is deposited along the line that renders the line, and also the chambers within which the silane is intended for use, unuseable thereafter for integrated circuit manufacture. The Anderson device treats a flow system extending from a fuel source to a place of intentional fuel combustion, and the device is intended to prevent flashback from the point of combustion back to the fuel source. The device will extinguish such a flame, but in addressing only the prevention of flashback in the direction of the fuel source, Anderson provides no means for limiting the spread of such contaminating residue downstream from the combustion source—the flames sought to be controlled in the Anderson device and in the present invention are traveling in opposite directions.

Application of the Anderson method and apparatus in the context addressed by the present invention is further precluded by the means by which the Anderson device controls the undesired flame, namely, by sending towards such an approaching flame front (i.e., downstream towards the point of intended combustion) a quantity of non-combustible gas, the effect of which would necessarily include transmitting in that same direction some quantity of combustion products, i.e., in the case of a silane explosion the very sand-like contaminant that it is the purpose of the present invention to prevent from so traveling. Anderson thus teaches precisely away from the present invention.

Finally, U.S. Pat. No. 3,933,444 issued Jan. 20, 1976, to Kilgore, describes a flashback arrestor that likewise addresses the control of flame fronts that are traveling in the direction opposite to that which is of concern in the present invention. The Kilgore device comprises a valve at an inlet end of a gas line that is actuated by pressures from the flashback at the outlet end of the gas line, and including a piston that is forced by such back pressure into a valve seat at the inlet end of the gas line. That process leaves the gas line itself entirely contaminated with combustion products, hence the Kilgore device is inapplicable to the problem that the present invention addresses.

Silane is a gas that is critical in the manufacturing of integrated circuits (ICs), inasmuch as it provides the silicon for deposition on the IC. Every integrated circuit manufacturing facility in the world that treats silicon-based ICs has at least one source for this gas. FIG. 1 shows a typical flow path for silane, designated generally herein as system 10 (prior art). The general structure of system 10 may include a subfab floor 12, above that a waffle slab 14, and then above that a raised floor 16, on which the various active components of system 10 are installed as hereinafter shown and described.

Commencing at the level of subfab floor 12, silane gas bottles 18 are typically stored in a gas cabinet or, in more recent installations and as shown in FIG. 1, in an outside gas bunker or gas pad 20. The silane gas bottles 18 and associated valves 22 and gas line 24, both in such a gas cabinet, bunker or gas pad 20, are subject to being compromised through human error when handling the gas upon changing bottles 18, purging control panels, or replacing hardware on the gas panel (not shown) itself. One loose fitting or a wrongly opened valve 22 would allow exposure of the silane to the atmosphere, causing the pyrophoric silane reaction to begin.

From the cabinet or gas pad 20, the silane will typically flow through one or more valves 22 to line 24 and thence to a valve manifold box ("VMB"), of which VMB 26 is shown in FIG. 1. The purpose of VMB 26 is to provide gas distribution means whereby a particular gas can be routed from a single source of that gas for use in more than one tool. VMB 26 will typically have 2–8 branches (also called "sticks"), of which only four sticks 28 are shown in FIG. 1 (and for which the subsequent routing is shown only for stick 28, each such stick 28 then carrying the silane from its source to a particular tool. Valves 22 of VMB 26 may be either automatically controlled or manual, but both offer opportunities for human error and component failure.

As to each stick 28, from VMB 26 the gas flows to gas isolation box ("GIB") GIB 30, which contains a valve 22.

GIB 30 is usually located near to the tool at which the gas is to be used, and gives to the tool technicians the ability either to view and regulate the gas pressure or to turn the gas off before it gets to the tool itself.

The next point along the path of system 10 is commonly referred to as a "gas jungle," e.g., gas jungle 32, which may be either a part of the tool or more commonly a gas box outside of the tool. This is where all of the gases serving the tool come together before actually going into the individual chambers of the tool. Gas jungle 32 is the final point of pressure regulation as well as the point of flow control. This flow control is achieved by using a device called a mass flow controller, or "MFC," e.g., MFC 34. Also included within gas jungle 32, but not shown for purposes of clarity, will be an array of valves, regulators, pressure transducers and the like, as will be known to a person of ordinary skill in the art. This part of the line is also subject to human error and possible silane reaction in the course of maintenance work. The box-like elements shown separately to the left of gas jungle 32 in FIG. 1 are an array of chambers within a particular tool to which system 10 is attached through gas jungle 32, and in this case showing four chambers 36 only as an example, since that number may vary in practice.

If a leak occurs at any point along the path just described, because of the resulting pyrophoric explosion the line will become worthless for production, from the point of the leak to the next closed valve. The cost of that damage can range from a few thousand dollars to a half million dollars, depending on the extent of the line exposure. This does not take into account downtime or opportunity costs. The inventors herein are unaware of any art prior device that is intended to address the specific problem just described. It is the purpose of the present invention to stop the reaction regardless of the direction of the leak from the apparatus comprising an embodiment of the invention, thus limiting the damage. The apparatus may, of course, be used at multiple points along a given line to achieve extra line protection.

BRIEF SUMMARY OF THE INVENTION

The apparatus serves as a protection device for silane lines as used in the manufacture of semiconductor integrated circuits, but also, with proper scaling, can be used in other areas such as natural gas lines and the like. Basically, the apparatus acts as a flash arrestor, but by way of methods and apparatus not previously seen in the art. The apparatus is activated to close by means of a 2-seat flow/pressure system that operates in either direction; employs "off-set" filter media packing to extend reaction flow path; acts as a fire safety device, equipment protection device, double isolation valve, and a sub-micron filter; is compatible with traditional UHP components as well a surface mounts; comprises a passive component; serves also as a shock tube so as to concentrate the power of a shock wave and corresponding pressure increase that actuates the valve; and, so as to operate in either direction, employs UHP activators that are cross-connected so that the apparatus will activate from a stimuli that arrives from either "upstream" or "downstream." The apparatus may be placed anywhere along silane or similar gas lines, typical installation locations for the apparatus as now contemplated by this present specification being shown by the dark circles in FIG. 1; and similarly in natural gas lines or other applications in the petroleum industry, in the realm of aerospace and rocketry, or in any other context wherein flammable, explosive, or pyrophoric substances present a hazard. Wherever placed, the apparatus is intended to stop the silane/oxygen or similar such reactions, thus preserving from damage all lines and equipment on the protected side of the apparatus, or otherwise preventing catastrophic disasters.

There are two basic processes at work in the apparatus. The first is the reduction of heat in the reaction, using a filter media to temporarily stop the reaction (on the order of milliseconds). The second process lies in using the shockwave and the momentary pressure surge of the reaction to actuate a multi-port diaphragm valve. This event occurs before the reaction has had any opportunity to restart, thus isolating the reaction and protecting the portion of the line isolated by the device on the opposite side of the reaction.

The device consists of two canisters containing both filter media and inert packing. The filter media prevents particulate contamination through the pipeline, while the packing removes enough heat from the reaction to stop the reaction and flame front momentarily. The canisters are attached to a main body that directs the flow path of the gases. The flow path for the reacted gases is intentionally designed such as to delay the flame front in order to provide adequate time for the valves to shut once actuated by the shock wave and actuation pressure. This process isolates the contaminated line from the uncontaminated portion of the line. There are two valve seats with diaphragms that all close initially under pressure of the shockwave, then remain closed via the use of magnetic forces.

The apparatus also acts as a double isolation valve. Both valves (one in each canister) are positively operational manually in the On and Off positions. The Armed position is used to activate the passive silane arrestor, during which the valves are held open magnetically, and held magnetically closed if activated.

DETAILED DESCRIPTION OF THE INVENTION

Figure 2:
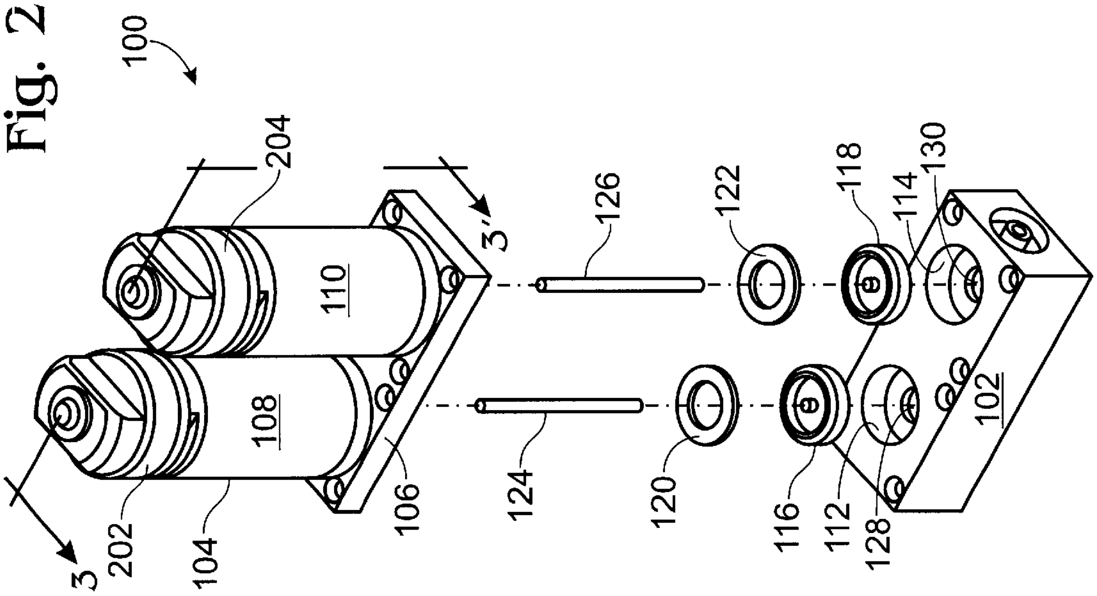
FIG. 2 is an exploded, oblique view of a preferred embodiment of the invention.
Figure 1:
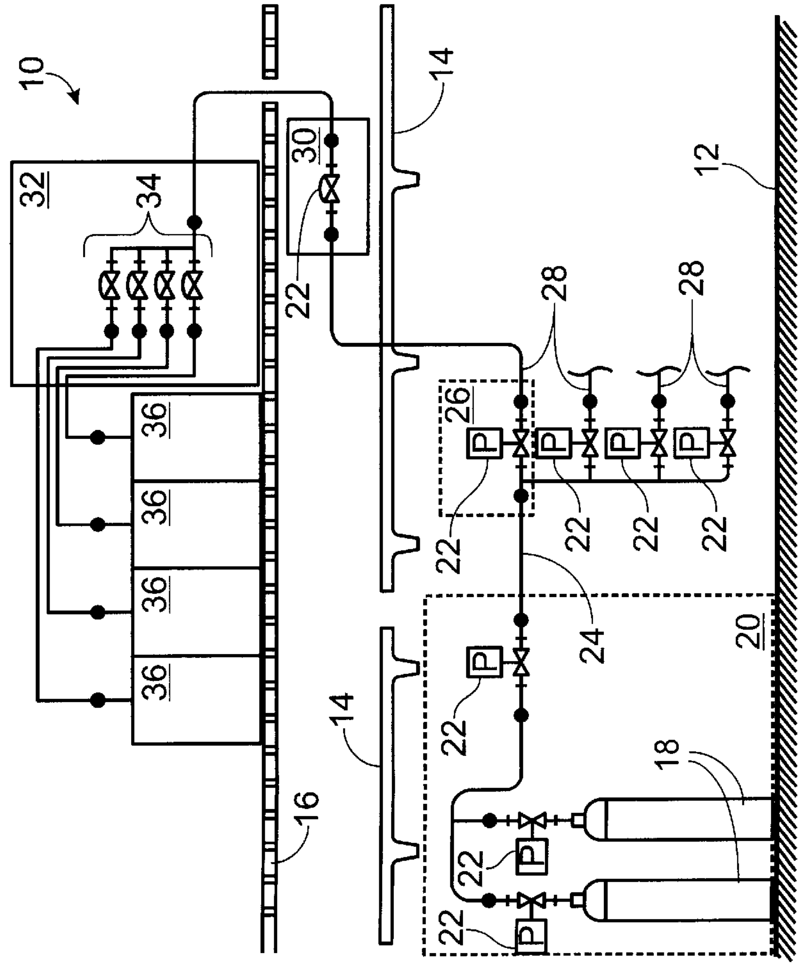
Fig. 1 (PRIOR ART)
FIG. 1 shows in block diagram form, from the prior art, a typical installation of a silane gas line as an example of one context in which the invention may be employed.

Flash arrestor 100 is shown in an exploded, oblique form in FIG. 2 and is seen first to comprise an arrestor base 102 above which is disposed a suppression assembly 104 including firstly a suppression assembly base 106, above which are then disposed and in fluid connection therewith a first suppression cylinder 108 and adjacent thereto a second suppression cylinder 110, wherein first and second suppression cylinders 108, 110 are identical in form and respectively define what shall hereinafter be referred to as "side A" and "side B" of flash arrestor 100.

Disposed on an upper surface of suppression assembly base 106 are identical first and second valve chambers 112 and 114, the first being on Side A and the second on Side B. Within first and second valve chambers 112, 114 are identical first and second valve assemblies 116 and 118, and above those respectively are disposed first main seal 120 and second main seal 122. Centrally disposed through central apertures within first valve chamber 112, first valve assembly 116, and first main seal 120, on the one hand, and through like apertures within second valve chamber 114, second valve assembly 118, and second main seal 122, on the other hand, are respectively disposed identical first and second rods 124 and 126 which, on the respective Sides A and B, are disposed within a corresponding pair of shock tubes that will be discussed below.

Figure 3:
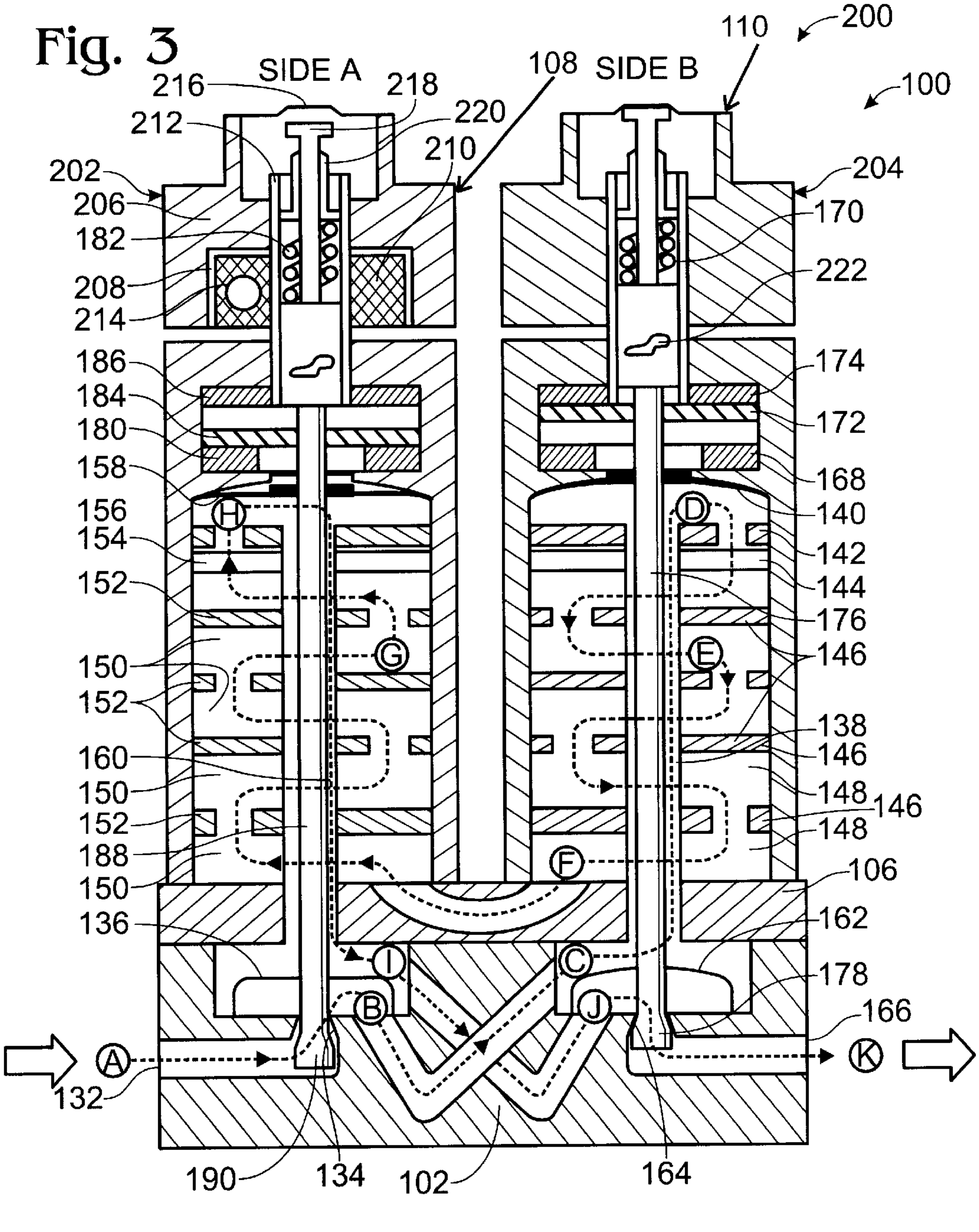
FIG. 3 is a functional representation of a preferred embodiment of the invention, with reference to a vertical cross-section thereof taken through the lines 3—3' of FIG. 2, whereby the operation of the apparatus is traced through a sequence of lettered points A–K.

Now to be described by way of FIG. 3 is the flow of silane, and also the flow of a flame front and shock wave, through flash arrestor 100 that is connected in-line in a silane line. The former silane flow is termed "normal flow conditions," and the latter is termed "line breach conditions," as set out below under those specific headings. All of the elements indicated should be taken to be in sequential fluid connection as shown in FIG. 3 through recitation of the points A–K:

Normal Flow Conditions

Gas flows into flash arrestor 100 through first inlet/outlet 132 at Point A. The term "inlet/outlet" is used to emphasize that although the following description describes a gas flow commencing at what has been termed "Side A," flash arrestor 100 has a truly symmetrical structure in that Sides A and B are identical, and the gas flow could as well have been described as going in the opposite direction.

Gas flows through first valve seat 134 on Side A (point B) and is contained by first lower diaphragm 136.

Gas flows to first shock tube 138 on Side B (point C). First rod 124 (first valve stem 176) is fixedly connected within the interior length of shock tube 138. The purpose of shock tube 138 is to support and contain baffles 146 and provide a flow path.

Gas flows through first shock tube 138 to first upper actuating diaphragm 140 on Side B (point D).

Gas flows through first shock resonating orifice plate 142 to first filter disk 144 on Side B.

Gas flows through four first baffles 146, and also through first suppression media 148 that surround and lie between first baffles 146 (point E).

At Point F, the gas flow crosses over to Side A second suppression media 150 and second baffles 152 (point G) that are interleaved in the same manner as are first baffles 146 and first suppression media 148.

Gas flows through second filter disk 154 on Side A and thence through second shock resonating orifice plate 156.

Gas flows up to second upper actuating diaphragm 158 to point H.

Gas flows down through Side A second shock tube 160 (point I) and across to Side B beneath second lower diaphragm 162.

Gas flows past second valve seat 164 on Side B (point J) and then through second inlet/outlet 166 at point K. (That second valve seat 164 is shown as being closed in FIG. 3 should for the present be ignored.)

Under Line Breach Conditions

A reaction flame front and shock wave reach first inlet/outlet 132 at Point A. Here it must be emphasized that although the reaction flame front and shock wave will be described as moving in the same direction as the gas flow, e.g., into flame arrestor 100 through first inlet/outlet 132 on Side A, a flame front and shock wave could as well originate on Side B and hence enter flame arrestor 100 through second inlet/outlet 166. That is to say, a breach in a gas line could occur either "upstream" or "downstream" from flash arrestor 100, and thus the resultant flame front and shock wave could be traveling in the same direction as the gas flow in the first case, or in the opposite direction from the gas flow in the second case.

The flame front and shock wave proceed through first valve seat 134 on Side A (point B) and are contained and directed towards Side B by first lower diaphragm 136.

Flame front and shock wave proceed to first shock tube 138 on Side B (point C).

Flame front and shock wave proceed through first shock tube 138 to first upper actuating diaphragm 140 on Side B (point D).

Resonant shock waves and resultant pressure rise from the reaction impart energy to actuate first upper actuating diaphragm 140, overcoming the force of first open magnet 168 and first set spring 170, allowing first actuator piston 172 to travel upward and mate with first closed magnet 174. By the process just described, first valve stem 176 will have been moved upward so as to seat first valve poppet 178 tightly against second valve seat 164, which is the condition shown in FIG. 3, side B.

The shock wave and flame front travel through first shock resonating orifice plate 142 to first filter disk 144, which will remove any particulate matter, i.e., silicon dioxide formed by the reaction.

The shock wave and flame front pass through first filter disk 144 to first baffles 146 and first suppression media 148 (point E), which remove enough heat from the reaction to temporarily extinguish the same, thereby delaying the flame front propagation sufficiently to allow the shock wave and resultant pressure rise from the reaction to complete the closing of the side B valve, again as shown in FIG. 3, side B.

The shock wave propagates ahead of the delayed flame front before the re-ignited flame front reaches second valve seat 164 on side B (point J). The medium of first filter disk 144 also provides a delay time needed for first valve poppet 178 to close against second valve seat 164 prior to being reached by the flame front.

At Point F the reaction crosses over to the Side A second suppression media 150 and second baffles 152 (point G). The flame front is further delayed/extinguished in second suppression media 150.

The shock wave continues up through second filter disk 154 and second shock resonating orifice plate 156 to point H.

The shock wave continues down through second shock tube 160 and above first lower diaphragm 136 (point I). The flame front is continually extinguished and re-ignites all the way back to Side B second valve seat 164 (point J).

The shock wave continues on to second valve seat 164 on Side B (point J) and to second inlet/outlet 166 at point K, which is now closed off so that the flow is blocked. The pressure of the reaction, upon reaching this point, serves to force first valve poppet 178 to be seated more tightly against second valve seat 164. Consequently, the reaction is stopped at closed second valve seat 164, causing no further damage to lines or equipment on the Side B portion of the device. Upon the occurrence of the aforesaid events, the side A portion of flash arrestor 100 would contain gases that were completely reacted and inert, having exhausted all reactants.

From the symmetry of flash arrestor 100 as shown in FIG. 3, it will be evident that upon a flash or flame event originating on side B, second inlet/outlet 166 would act in the manner of first inlet/outlet 132 as was described relative to an explosive event originating on side A, and such a "Side B" flash or flame event would be arrested in like manner. For that purpose, side A incorporates the components second open magnet 180, second set spring 282, second actuator piston 184, second closed magnet 186, second valve stem 188, and second valve poppet 190 as shown in FIG. 3, which are disposed in like manner and function precisely the same as the corresponding Side B elements just described.

Figure 4:
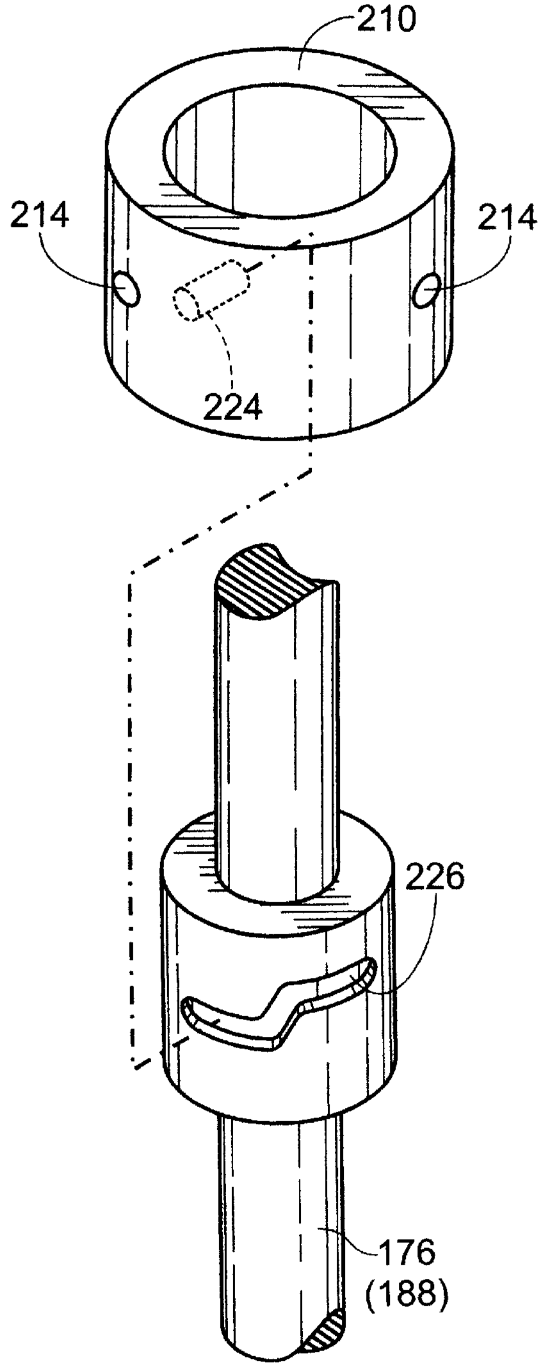
FIG. 4 shows an internal structure of one of the valve positioner assemblies of FIG. 3.

FIG. 3 also includes identical first and second valve positioner assemblies 202, 204, the structure of one of which is shown greater detail in FIG. 4, and wherein the valve positioner assembly as such is designated generally in FIG. 4 as valve positioner assembly 200. FIG. 3 also shows in cutaway a portion of the structure of first valve positioner assembly 202, wherein handle 206 is seen to include a hollow toroidal detent chamber 208, within which is disposed a toroidal detent carriage 210, and cylindrical bonnet stem 212 that passes coaxially through both detent chamber 208 and detent carriage 210. Bonnet stem 212 is fixedly attached to handle 206 and rotates relative to detent carriage 210. Detent carriage 210 includes three detents 214 (only one is shown in FIG. 3) distributed at relative angles of 1200 around an outer circumference of detent carriage 210, and which serve to hold handle 206 in one of three positions as will be discussed below.

A window 216 is located at the central top of valve positioner assembly 202, through which can be seen the location of a broadened end of valve stem 188 that serves as position indicator 218, i.e., on Side A of FIG. 3 position indicator 218 is shown to be below window 216, meaning that the valve of Side A is open, while on Side B it can be seen that the corresponding position indicator is within its window, thereby indicating that the Side B valve is closed.

Valve positioner assembly 202 also includes a valve stem sleeve 220 that is centrally and coaxially disposed within and near the top of bonnet stem 212, and which provides for a vertical sliding movement of either second valve stem 188. The operation of valve positioner assemblies 200 (i.e., 202 and 204) is further explained in FIG. 4 in terms of the element 222 of FIG. 3, which designates valve positioner 222.

FIG. 4 shows an internal structure of a valve positioner assembly 200. This structural detail of valve positioner 222 in particular, the location of which is shown by the S-shaped symbol in FIG. 3, and depending upon to which of Sides A or B one may refer, serves to place either first valve stem 176 or second valve stem 188 to cause an open position of the valve as shown on Side A of FIG. 3, or in a closed position as shown on Side B of FIG. 3. More exactly, In addition to the indicated valve stems, detent carriage 210 and detents 214, FIG. 4 also shows an internal mechanism for lifting first or second valve stems 176 or 188, which operates through positioning pin 224 and positioning slot 226. In short, by rotation of handle 206, positioning pin 224 is caused to move in a path that passes end to end through positioning slot 226, and since the location of positioning pin 224 is vertically fixed, positioning slot 226 must then move up or down, thereby to move the associated valve stem up or down.

Figure 5:
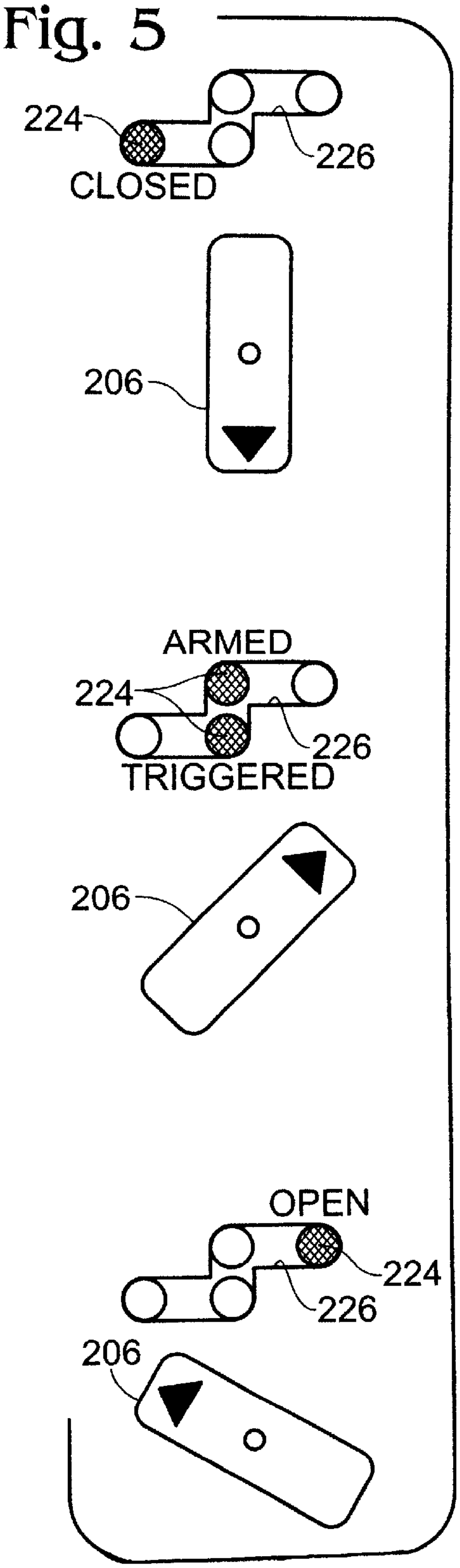
FIG. 5 shows in sketch form a projected view of a positioning slot, three positions of the apparatus handle, and the corresponding positions of a positioning pin within the positioning slot.

The several positions of handle 206 are set out in FIG. 5, which is a top plan view of three different positions of a central elongate portion of handle 206, the roles of each of which are described below relative to positions (at relative angles of 120°) designated as "open," "closed," and "armed," as follows:

OPEN: When handle 206 is rotated fully counter-clockwise (looking downward), bonnet stem 212 rotates likewise, valve positioning pin 224 travels within valve positioning slot 226 to a first extreme position, thereby pushing the valve stem downwardly so that the relevant valve poppet (178 or 190) will be removed out of the corresponding valve seat (164 or 134, respectively), thus to attain an "open" position as shown on Side A of FIG. 3. Position indicator 218 will also be moved out of window 216 to show that "open" position as to Side A, and of course a similar process would occur with respect to Side B. This position of handle 206 is shown in the leftward-most drawing of FIG. 5, together with the corresponding location of valve positioning pin 224 within valve positioning slot 226.

CLOSED: When handle 206 is rotated fully clockwise, bonnet stem 212 again rotates therewith, valve positioning pin 224 again travels within valve positioning slot 226 to a second extreme position, thereby lifting the valve stem upwardly so that the relevant valve poppet (178 or 190) will be lifted into the corresponding valve seat (164 or 134, respectively), thus to attain the "closed" position as shown on Side B of FIG. 3. In this case, Side B of FIG. 3 also shows the position indicator to be within the window so as to indicate that "closed" position. This position of handle 206 is shown in the rightward-most drawing of FIG. 5, together with the corresponding location of valve positioning pin 224 within valve positioning slot 226.

ARMED: When handle 206 is placed in a central position between the aforesaid two extremes, from the structure of valve positioning slot 226 it is clear that the vertical position thereof could be either upward or downward, being unconstrained with respect thereto by valve positioning pin 224. The procedure for attaining that condition rests first in "opening" the relevant valve by turning handle 206 fully counter-clockwise. Either of the "open" magnets (168 or 180), together with corresponding set springs (170 or 182), will then hold the valve in an "open" state. Handle 206 is then moved to its midpoint position as shown in the central drawing of FIG. 5, which action by itself will cause no motion of the relevant valve stem, and for which the location of valve positioning pin 224 within valve positioning slot 226 is again shown. Given that vertical movement of that relevant valve stem is not constrained when handle 206 is in that mid-point position, the full sequence of events that were previously described in the context of the occurrence of an explosion may occur, i.e., the side of flash arrestor 100 that was so involved will then have been "triggered" into a closed position, the location of valve positioning pin 224 within valve positioning slot 226 again being shown in FIG. 5. Such "vertical" movement, of course, results not from any movement of valve positioning pin 224, but rather from vertical movement of valve positioning slot 226. The position so attained may be set positively by rotation of the appropriate handle 206 fully clockwise, as noted above with respect to the "closed" position.

Other arrangements and disposition of the aforesaid or like components, the descriptions of which are intended to be illustrative only and not limiting, may also be made without departing from the spirit and scope of the invention, which must be identified and determined only from the following claims and equivalents thereof.

We claim:

1. A flash arrestor comprising two flash suppressor assemblies that are fluidly cross-connected one with the other through a hollow tube, wherein said cross-connection comprises a connection from a first one of said two flash suppression assemblies to the second one of said two flash suppression assemblies and another connection from said second one of said flash suppression assemblies back to said first one of said two flash suppression assemblies; whereby after an entry of an explosion region into said flash arrestor, such an explosion region will be passed twice, in opposite directions, between said two flash suppression assemblies, each of said flash suppressor assemblies further having an output.

2. The flash arrestor of claim 1 further comprising valve control means disposed in line within both of said two flash suppression assemblies, said valve control means within said second one of said two flash suppression assemblies being activated upon entry of an explosion region into said second one of said two flash suppression assemblies, thereby to commence closing said output of said second one of said two flash suppression assemblies prior to said explosion region having reached said output of said second one of said two flash suppression assemblies.

3. The flash arrestor of claim 1 further comprising shock tubes disposed in line with said fluid connection in both of said two flash suppression assemblies.

4. A flash arrestor comprising two flash suppressor assemblies and a fluid connection that begins at an input to a first one of said two flash suppression assemblies, passes therethrough to the second one of said two flash suppression assemblies, passes through said second one of said two flash suppression assemblies, and then passes back to and through said first one of said two flash suppression assemblies to said second one of said two flash suppression assemblies to an output therefrom.

5. The flash arrestor of claim 4 further comprising valve control means within both of said two flash suppression assemblies, said valve control means within said second one of said two flash suppression assemblies being activated upon entry of an explosion region into said second one of said two flash suppression assemblies, thereby to commence closing said output of said second one of said two flash suppression assemblies prior to said explosion region having reached said output of said second one of said two flash suppression assemblies.

* * * * *